(12) United States Patent  (10) Patent No.: US 8,510,607 B2
Jaffar et al.  (45) Date of Patent: Aug. 13, 2013

(54) EFTB UNIT, USB DEVICE WITH THE EFTB UNIT AND METHOD FOR RESETTING AND REENUMERATING THE USB DEVICE

(75) Inventors: Rizal Jaffar, Melaka (MY); Kwai Lee Pang, Perak (MY); Kevin Len-Li Lim, Perak (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 403 days.

(21) Appl. No.: 13/007,930

(22) Filed: Jan. 17, 2011

(65) Prior Publication Data

US 2012/0185723 A1    Jul. 19, 2012

(51) Int. Cl.
*G06F 11/00* (2006.01)
(52) U.S. Cl.
USPC .............................. 714/44; 714/43
(58) Field of Classification Search
None
See application file for complete search history.

(56) References Cited

U.S. PATENT DOCUMENTS

| | | | |
|---|---|---|---|
| 6,101,076 A * | 8/2000 | Tsai et al. | 361/90 |
| 6,137,333 A | 10/2000 | Williams et al. | |
| 7,269,531 B2 | 9/2007 | Brouhon | |
| 7,493,422 B2 * | 2/2009 | Farquhar | 710/15 |
| 7,629,958 B1 | 12/2009 | Nicolet et al. | |
| 7,742,036 B2 | 6/2010 | Grant et al. | |
| 8,020,049 B2 * | 9/2011 | Asuncion et al. | 714/56 |
| 2009/0207538 A1 | 8/2009 | Crawley et al. | |

* cited by examiner

*Primary Examiner* — Michael Maskulinski (57) ABSTRACT

A method for resetting and reenumerating a Universal Serial Bus (USB) device, an Electrical Fast Transient/Burst (EFTB) unit of a USB device for resetting and reenumerating the USB device and a USB device are described. In one embodiment, a method for resetting and reenumerating a USB device involves detecting a USB reset command from a host device at a USB device, setting a reset flag in the USB device in response to the detecting of the USB reset command, determining if the USB device is in a corrupted state in response to the reset flag, and causing a Single Ended Zero (SE0) signal to be issued to reset the USB device out of the corrupted state and reenumerate the USB device back to the host device if the USB device is determined to be in the corrupted state. Other embodiments are also described.

20 Claims, 4 Drawing Sheets

EFTB UNIT, USB DEVICE WITH THE EFTB UNIT AND METHOD FOR RESETTING AND REENUMERATING THE USB DEVICE

BACKGROUND

During an Electrical Fast Transient/Burst (EFTB) event, electrical noise can digitally corrupt a Universal Serial Bus (USB) device into a corrupted state. Thus, USB communications between the USB device and a host device may be disrupted after an EFTB event. If the USB communications are disrupted, the host device will reinitiate communications with the USB device.

In order to reinitiate communications with the USB device, the host device typically sends a reset command to the USB device to reset the USB device. Conventionally, the USB device includes an analog circuit that is used to detect an EFTB event, to reset the USB device and to reenumerate the USB device back to the host device. The analog circuit may use an extra package pin as an antenna. However, the extra package pin may not be available in low pin-count packages. In addition, the analog circuit is subjected to wafer process variations and external influences such as board layout, supply voltage variation and operating temperature, which may degrade the performance of the analog circuit.

SUMMARY

A method for resetting and reenumerating a USB device, an EFTB unit of a USB device for resetting and reenumerating the USB device and a USB device are described. In one embodiment, a method for resetting and reenumerating a USB device involves detecting a USB reset command from a host device at a USB device, setting a reset flag in the USB device in response to the detecting of the USB reset command, determining if the USB device is in a corrupted state in response to the reset flag, and causing a Single Ended Zero (SE0) signal to be issued to reset the USB device out of the corrupted state and reenumerate the USB device back to the host device if the USB device is determined to be in the corrupted state. Other embodiments are also described.

Embodiments of a method are described. In one embodiment, a method for resetting and reenumerating a USB device involves detecting a USB reset command from a host device at a USB device, setting a reset flag in the USB device in response to the detecting of the USB reset command, determining if the USB device is in a corrupted state in response to the reset flag, and causing an SE0 signal to be issued to reset the USB device out of the corrupted state and reenumerate the USB device back to the host device if the USB device is determined to be in the corrupted state. Other embodiments of a method are also described.

Embodiments of an EFTB unit of a USB device for resetting and reenumerating the USB device are described. In one embodiment, an EFTB unit of a USB device for resetting and reenumerating the USB device includes an analog reset detector configured to detect a USB reset command from a host device and to set a reset flag in response to the detection of the USB reset command and a digital EFTB controller configured to determine if the USB device is in a corrupted state in response to the reset flag and to cause an SE0 signal to be issued to reset the USB device out of the corrupted state and reenumerate the USB device back to the host device if the USB device is determined to be in the corrupted state. Other embodiments of an EFTB unit of a USB device for resetting and reenumerating the USB device are also described.

Embodiments of a USB device are described. In one embodiment, a USB device includes a padframe containing Input/Output (IO) pads, a USB device controller configured to transmit signals to a host device via the IO pads and to generate USB status signals based on signals that are received from the host device via the IO pads, an EFTB unit that includes an analog reset detector configured to detect a USB reset command from the host device and to set a reset flag in response to the detection of the USB reset command and a digital EFTB controller configured to determine if the USB device is in a corrupted state in response to the reset flag and the USB status signals and to cause an SE0 signal to be issued to reset the USB device out of the corrupted state and reenumerate the USB device back to the host device if the USB device is determined to be in the corrupted state, an IO controller coupled to the USB device controller, the IO pads and the EFTB unit, and a reset controller configured to reset the USB device globally and out of the corrupted state in response to the SE0 signal. Other embodiments of a USB device are also described.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
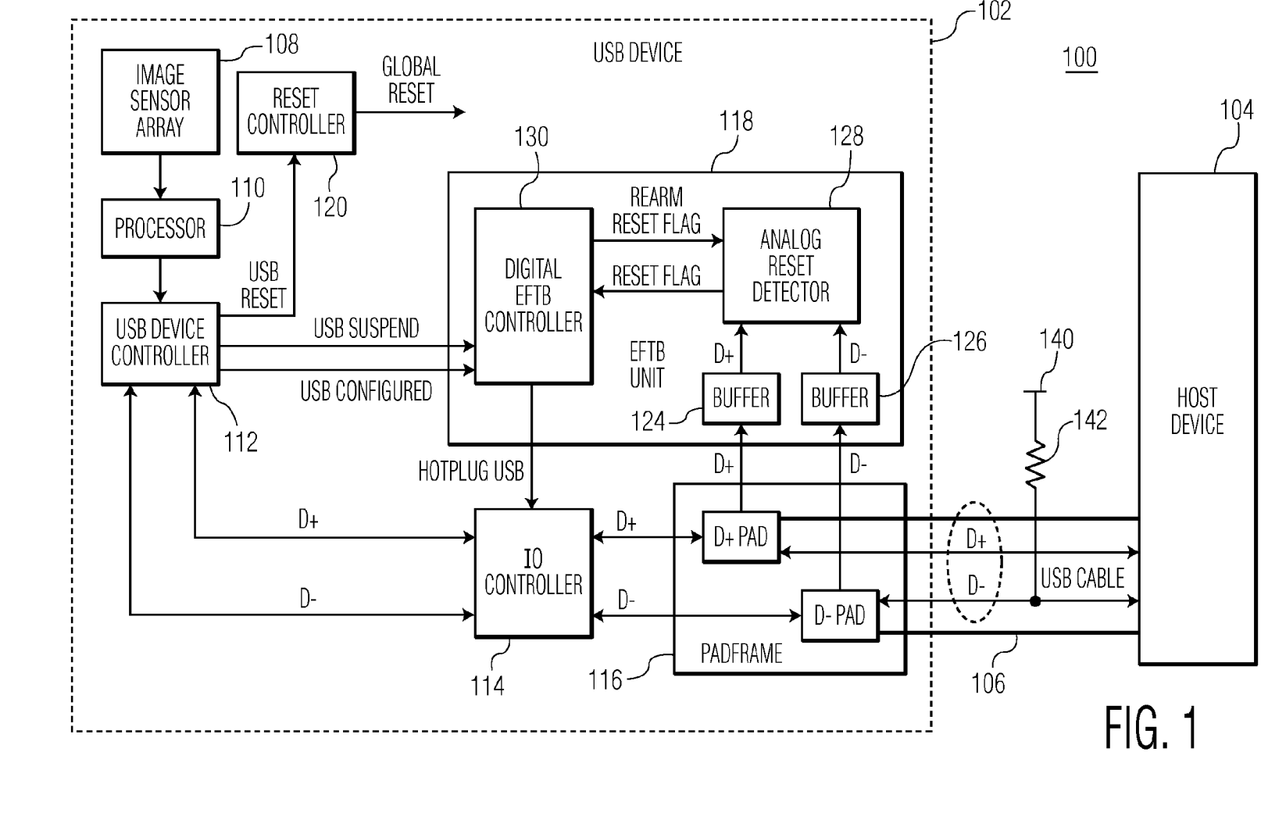
FIG. 1 is a schematic block diagram of a USB communications system in accordance with an embodiment of the invention.

FIG. 1 is a schematic block diagram of a USB communications system 100 in accordance with an embodiment of the invention. The USB communications system is configured to facilitate data communications between devices through a USB connection. In the embodiment depicted in FIG. 1, the USB communications system includes a USB device 102 and a host device 104 that is connected to the USB device via a USB cable 106. Although the USB communications system is depicted and described with one host device and one USB device, the USB communications system may include more than one USB device and/or more than one host device.

In the embodiment depicted in FIG. 1, the USB device 102 is used for optical motion estimation. Thus, the USB device may be embodied in an optical mouse. However, the USB device may be used for other applications. The USB device includes an image sensor array 108, a processor 110, a USB device controller 112, an IO controller 114, a padframe 116, an EFTB unit 118 and a reset controller 120. Although the USB device is depicted and described with certain components and functionality, other embodiments of the USB device may include fewer or more components to implement less or more functionality. For example, when the USB device is used for applications other than motion estimation, the USB device may not include the image sensor array and the processor.

The image sensor array 108 of the USB device is configured to obtain image information. The image sensor array includes multiple photosensitive pixel elements, such as charge coupled devices (CCDs) or Complementary Metal Oxide Semiconductor (CMOS) pixel sensors. In some embodiments, the image sensor array may be formed of two or more sub-arrays of photosensitive pixel elements.

The processor 110 of the USB device 102 is configured to process the image information from the image sensor array 108 to generate navigation signals. The navigation signals can be used by the host device 104 for navigation in a computer environment, such as a computer operating system. The processor may be a general-purpose digital processor such as a microprocessor or microcontroller. In other embodiments, the processor may be a special-purpose processor such as a digital signal processor. In still other embodiments, the processor may be another type of controller or a field programmable gate array (FPGA).

In the embodiment depicted in FIG. 1, the USB device controller 112 of the USB device 102 allows the host device 104 to recognize the USB device as a low-speed human interface device (HID). Specifically, the USB device controller is configured to transmit the navigation signals from the processor 110 to the host device. In addition, the USB device controller is configured to transmit a reset signal to the reset controller 120. The reset signal may be generated by the EFTB unit 118 and/or the IO controller 114. Furthermore, the USB device controller is configured to generate USB status signals based on signals from the host device. The USB device controller may also be configured to generate a pad output enable control signal to enable one or more IO pads in the padframe 116.

The IO controller 114 of the USB device 102 serves as a communications proxy between the USB device controller 112, the padframe 116 and the EFTB unit 118. Specifically, the IO controller transmits data signals and/or command signals, which are received from the host device 104 via the padframe, to the USB device controller. In addition, the IO controller transmits signals from the USB device controller and the EFTB unit to the host device via the padframe. In an embodiment, the IO controller enables the EFTB unit to override the navigation signals from the USB device controller. In the embodiment depicted in FIG. 1, the IO controller is separate from the USB device controller. However, the IO controller may be integrated with the USB device controller in other embodiments.

The padframe 116 of the USB device 102 contains IO pads of the USB device. The IO pads may be IO pins. In the embodiment depicted in FIG. 1, the padframe contains at least two IO pads "D+" and "D−." The padframe is connected to the host device 104 through the USB cable 106. In an embodiment, the USB cable is a USB type A cable.

In the embodiment depicted in FIG. 1, the USB device controller 112, the IO controller 114, the EFTB unit 118 and the host device 104 are connected through two signal lines D+/D−, which are connected to the corresponding IO pads D+ and D−. Thus, the USB device controller, the IO controller, the EFTB unit and the host device are able to receive and transmit signals through the signal lines D+/D−. In an embodiment, the USB device controller, the IO controller, the EFTB unit and the host device operate to receive and transmits signals through the signal lines D+/D− as follows. The EFTB unit and the IO controller receive data signals and/or command signals from the host device. The IO controller transmits the received data/command signals to the USB device controller. The USB device controller transmits the navigation signals from the processor 110 to the IO controller. The IO controller transmits the navigation signals received from the USB device controller to the host device. Alternatively, the IO controller receives at least one control signal from the EFTB unit and sends the control signal received from the EFTB unit to the host device, instead of sending the navigation signals received from the USB device controller to the host device. The IO controller also sends the control signal received from the EFTB unit to the USB device controller.

During an EFTB event, electrical noise that is generated by the EFTB event causes the USB device 102 to be digitally corrupted into a corrupted state. As a result, the EFTB event may disrupt USB communications between the USB device and the host device 104, causing the host device to reinitiate communications with the USB device by sending a USB reset command to reset the USB device out of the corrupted state. The EFTB unit 118 is configured to detect the EFTB event. In the embodiment depicted in FIG. 1, the EFTB unit includes a first buffer 124, a second buffer 126, an analog reset detector 128, and a digital EFTB controller 130.

The first and second buffers 124, 126 of the EFTB unit 118 are optional and are configured to buffer the data and command signals received from the IO pads D+ and D− and to transfer the received data and command signals from the IO pads D+ and D− to the analog reset detector 128. Specifically, the first buffer is used for signals that are received at the signal lines D+ while the second buffer is used for signals that are received at the signal line D−. In an embodiment, the buffers may be inverters, which are also known as NOT logic circuits. Although the EFTB unit is shown in FIG. 1 as including two buffers, in other embodiments, the EFTB unit may include a single buffer.

The analog reset detector 128 of the EFTB unit 118 is configured to detect a USB reset command from the host device 104 and to set a reset flag in response to the detection of the USB reset command. The analog reset detector is implemented as an analog circuit in the embodiment depicted in FIG. 1. As shown in FIG. 1, the analog reset detector detects the USB reset command from the host device via the D+ and D− IO pads of the padframe 116. In an embodiment, the analog reset detector triggers the reset flag when the analog reset detector receives the USB reset command in the form of an SE0 signal whose signal duration is more than a threshold time duration. An SE0 signal is detected when the signal lines D+/D− are pulled low. In other words, an SE0 signal is a signal that pulls the voltages at the signal lines D+/D− to be below a threshold voltage. In general, the analog reset detector is more reliable than a digital USB reset detector after an EFTB event since the digital USB reset detector may become corrupted due to the EFTB event.

Figure 2:
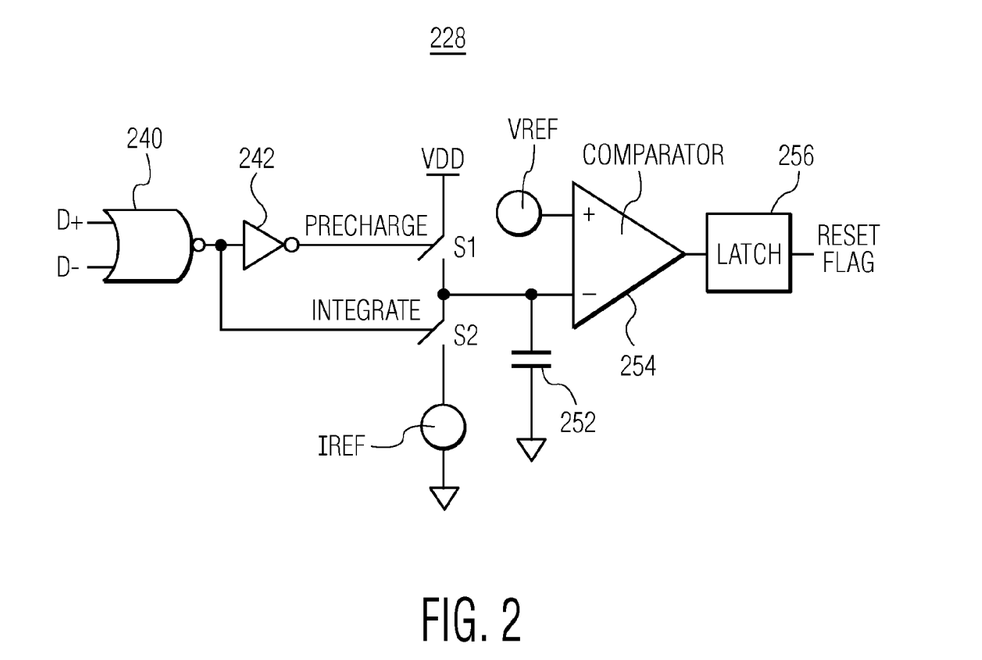
FIG. 2 depicts an embodiment of an analog reset detector of the USB communications system shown in FIG. 1.

In an embodiment, the analog reset detector 128 uses a capacitor discharge mechanism to detect a USB reset command from the host device 104. The capacitor discharge mechanism is designed to slowly discharge a capacitor when the signal lines D+/D− are pulled low, e.g., below a threshold signal value, as is the case when the host device 104 sends a USB reset command. Generally, under both a USB reset and an End Of Packet (EOP), the signal lines D+/D− are pulled low, which means that the signals at the signal lines D+/D− are low. Under a USB reset, the signal lines D+/D− are pulled low for 10 milliseconds (ms) to 20 ms. Under an EOP, the signal lines D+/D− are pulled low for 1.25 microseconds (μs) to 1.50 μs, which is significantly shorter than a typical low signal duration under a USB reset. Using the capacitor discharge mechanism, the analog reset detector triggers the reset flag when the analog reset detector receives an SE0 signal whose signal duration is more than a threshold time duration. The capacitor discharge mechanism allows the threshold time duration to be set to a value that is much larger than the signal duration of the typical SE0 signal of an EOP. For example, the threshold time duration can be set to 20 μs while the signal duration of a typical SE0 signal of an EOP is about 1.33 μs. In this case, the threshold time duration is over fifteen times longer than the signal duration of the typical SE0 signal of an EOP. By triggering the reset flag when the analog reset detector receives an SE0 signal whose signal duration is much longer than the signal duration of the typical SE0 signal of an EOP, false triggering of the reset signal under normal USB bus communications can be reduced or even eliminated. FIG. 2 depicts such an embodiment of the analog reset detector of FIG. 1.

In the embodiment depicted in FIG. 2, an analog reset detector 228 includes a NOR logic circuit 240, an inverter 242, a first switch "S1," a second switch "S2," a current source "$I_{ref}$," a voltage source "$V_{ref}$," a capacitor 252, a comparator 254, and a latch 256. The inverter, which is also known as a NOT logic circuit, receives data/command signals from the host device 104 via the signal lines D+ and D−. The NOR logic circuit is connected to the inverter and the second switch. The first switch S1 is connected to the inverter, the second switch S2, the capacitor, the comparator, and a voltage source $V_{DD}$. In an embodiment, the level of the voltage source $V_{DD}$ is higher than the voltage level of the voltage source $V_{ref}$. The second switch is connected to the current source $I_{ref}$, the first switch, the NOR logic, the capacitor, and the comparator. The comparator is connected to the latch. The latch is a memory element that holds the reset flag until the digital EFTB controller 130 (shown in FIG. 1) detects the reset flag. In the embodiment depicted in FIG. 2, the current source $I_{ref}$ and the capacitor is connected to ground.

An operation of the analog reset detector 228 in accordance with an embodiment of the invention is now described. Initially, the USB device 102 powers up into a USB low-speed idle condition in which the signal in the signal line D+ is low and the signal in the signal line D− is high. In an embodiment, when a signal is low, the value of the signal is lower than a low threshold signal value. Similarly, when a signal is high, the value of the signal is higher than a high threshold signal value. In another embodiment, when a signal is low, the signal is logical false, e.g., "0," and when a signal is high, the signal is logical true, e.g., "1." Since the signal in the signal line D+ is low and the signal in the signal line D− is high, the output of the NOR circuit is low. As a result, the "precharge" signal at the first switch 51 is high and the first switch 51 is closed. However, the "integrate" signal at the second switch S2 is low and the second switch S2 is open. Since the capacitor is connected to the voltage $V_{DD}$, the capacitor 252 starts to be charged to the level of the voltage source $V_{DD}$, which is above the voltage level of the voltage source $V_{ref}$. Because the voltage of the capacitor is above the voltage level of the voltage source $V_{ref}$, the output signal of the comparator 254 is low. The analog reset detector is now ready for reset command detection.

Under a USB reset command, both the signal lines D+ and D− are held low by the host device 104. Thus, the output of the NOR circuit 240 is high. As a result, the "precharge" signal is low and the first switch 51 is open, while the "integrate" signal is high and the second switch S2 is closed. Since the capacitor 252 is now connected to the current source $I_{ref}$, the capacitor starts to be discharged at a rate determined by the current source $I_{ref}$. After being discharged for a threshold time duration such as 20 μs, the voltage of the capacitor will be lower than the voltage level of the voltage source $V_{ref}$. As a result, the output signal of the comparator 254 is switched to high. In other words, the comparator triggers a reset flag. The reset flag is then stored in the latch 256.

Turning back to FIG. 1, the digital EFTB controller 130 of the EFTB unit 118 is configured to determine whether or not the USB device 102 is in a corrupted state in response to the reset flag and to cause an SE0 signal to be issued to reset the USB device out of the corrupted state and reenumerate the USB device back to the host device if the USB device is determined to be in the corrupted state. In an embodiment, the USB device is reenumerated back to the host device by reestablishing the communications between the USB device and the host device. The digital EFTB controller may be implemented in software stored in a computer readable medium, hardware, and/or a combination of software stored in a computer readable medium and hardware. In an embodiment, the digital EFTB controller is implemented as a simple instruction set central processing unit (CPU) with a pseudo-ROM. The pseudo-ROM may consist of tie-hi's and tie-lo's which can be metal mask changed. A tie-hi is a logic circuit which outputs a logical high (logical "1") signal. In an embodiment, a tie-hi logic circuit includes a metal connected to a voltage source of the USB device. A tie-lo is a logic circuit which outputs a logical low (logical "0") signal. In an embodiment, a tie-lo logic circuit includes a metal connected to the ground. A metal mask change, which is also known as a metal-mask engineering change order (ECO), is a change implemented by modifying only a few layers of a circuit. Compared to a hardcoded state-machine, the simple instruction set CPU with the pseudo-ROM allows a change to be made to the algorithm of the CPU more easily. Although the EFTB unit 118 is depicted and described with certain components and functionality, other embodiments of the EFTB unit may include fewer or more components to implement less or more functionality.

An operation of the digital EFTB controller 130 in accordance with an embodiment of the invention is now described. After the reset flag is set by the analog reset detector 128 and is transmitted to the digital EFTB controller, the digital EFTB controller determine if the USB device 102 is in a corrupted state. The USB device may be in the corrupted state because an EFTB event has occurred in the USB device. The digital EFTB controller determines whether or not an EFTB event may have occurred in the USB device. Specifically, the digital EFTB controller determines whether or not the USB device is in the corrupted state by inspecting the two logical signals "usb suspend" and "usb configured" from the USB device controller 112. In an embodiment, the logical signal "usb suspend" is generated as logic true, e.g., "1," when the USB device controller detects that the signal in the signal line D+ is low and the signal in the signal line D− is high for a period of time, such as 5 ms or more. The logical signal "usb suspend" is used to shutdown the USB device in a low power mode. In order to conserve power, the USB device may automatically enter a suspended state when the USB device has observed no bus traffic for a specified time period. In the suspended state, the logical signal "usb suspend" is set to logic true. When suspended, the USB device can maintain any internal status, such as configuration status. The USB device exits the suspended state when bus activity is detected. In an embodiment, the logical signal "usb configured" is generated as logic true when the USB device controller completes a SetConfiguration request from the host device. A SetConfiguration request from the host device sets the device configuration of the USB device. In an embodiment, if the reset flag from the analog reset detector is on, the signal "usb suspend" is logic true e.g., "1," and the signal "usb configured" is logic false, e.g., "0," the digital EFTB controller determines that an EFTB event may have occurred in the USB device. That is, once the USB device becomes suspended with no USB configuration, the digital EFTB controller can be certain that the host device has disabled the USB port to the USB device. If the reset flag from the analog reset detector is on and the signals "usb suspend" and "usb configured" do not satisfy the above configurations, the digital EFTB controller determines that an EFTB event has not occurred in the USB device.

The host device 104 does not know whether or not an EFTB event has occurred in the USB device 102. The host device attempts to reset the USB device when the USB device is not responsive. If no EFTB event has occurred in the USB device 102, after the USB device is reset, the host device goes through the enumeration process to get and set certain information required for normal USB operation of the USB device. After the enumeration process, the host device starts sending a keep-alive signal to prevent the USB bus from idling in the absence of data, which keeps the USB device from going into a suspended state. This keep-alive signal may be an EOP packet that is sent frequently, such as every 1 ms. The host device also starts periodical USB poll, such as every 8 ms, for motion data.

If an EFTB event has occurred in the USB device 102, the USB polling of the USB device is corrupted, leading the host device 104 to try to reset the USB device. The host device can send up to three USB reset commands before the host device decides that the USB device is non-responsive and disables the USB port or the USB connection to the USB device. The USB device then suspends itself due to the bus idle condition. However, resetting the USB device is an internal operation of the USB device. Even if the USB device is reset and works properly after the reset, the host device or an HID driver associated with the USB device will still consider the USB device as being malfunctioned and ignores the USB device, which makes the USB device inoperable after an EFTB event. Normally, to reenumerate the USB device back to the host device, a user of the USB device has to manually disconnect and then reconnect the USB device to the host device.

In the embodiment of FIG. 1, if the digital EFTB controller 130 determines that an EFTB event may have occurred in the USB device 102, the digital EFTB controller automatically reinitializes communications between the USB device and the host device 104 without user intervention. Specifically, the digital EFTB controller causes an SE0 signal to be sent to the host device. The SE0 signal detaches, re-attaches and reenumerates the USB device to the host device. In addition, the SE0 signal resets the USB device. Specifically, the digital EFTB controller generates a "hotplug usb" signal and transmits the "hotplug usb" signal to the IO controller 114. In response to the "hotplug usb" signal, the IO controller generates an SE0 signal and transmits the SE0 signal to the padframe 116 to pull the signal lines D+/D− low. After the host device detects that the signal lines D+/D− are pulled low, the host device considers that the USB device is disconnected and releases the HID driver for the USB device. The USB device controller 112 detects that the signal lines D+/D− are low for more than a period of time, such as 20 μs, and generates an "usb reset" signal which goes to the reset controller 120. The reset controller then generates a "global reset" signal which goes to all flip-flops, i.e. registers, and state-machines of the USB device, resetting these digital components out of any corrupted state. The analog reset detector detects that the signal lines D+/D− are low for more than a time period, such as 20 μs, and generates a reset flag, which is transmitted to the digital EFTB controller. The reset flag from the analog reset detector is a false flag due to the digital EFTB controller's action above. As a result, the digital EFTB controller ignores the reset flag and rearms or resets the analog reset detector. After the digital EFTB controller releases the signal lines D+/D−, the signal line D− is pulled high and the signal line D+ is pulled low. The host device detects a USB connection and starts the normal USB enumeration process. The USB enumeration process typically involves the hub (not shown) to which the USB device is attached informing the host device regarding the change of state. In response, the host device determines the nature of the change by querying the hub, enables the port to which the new USB device is attached, assigns an address to the USB device, and assigns configuration setting to the USB device.

Figure 3:
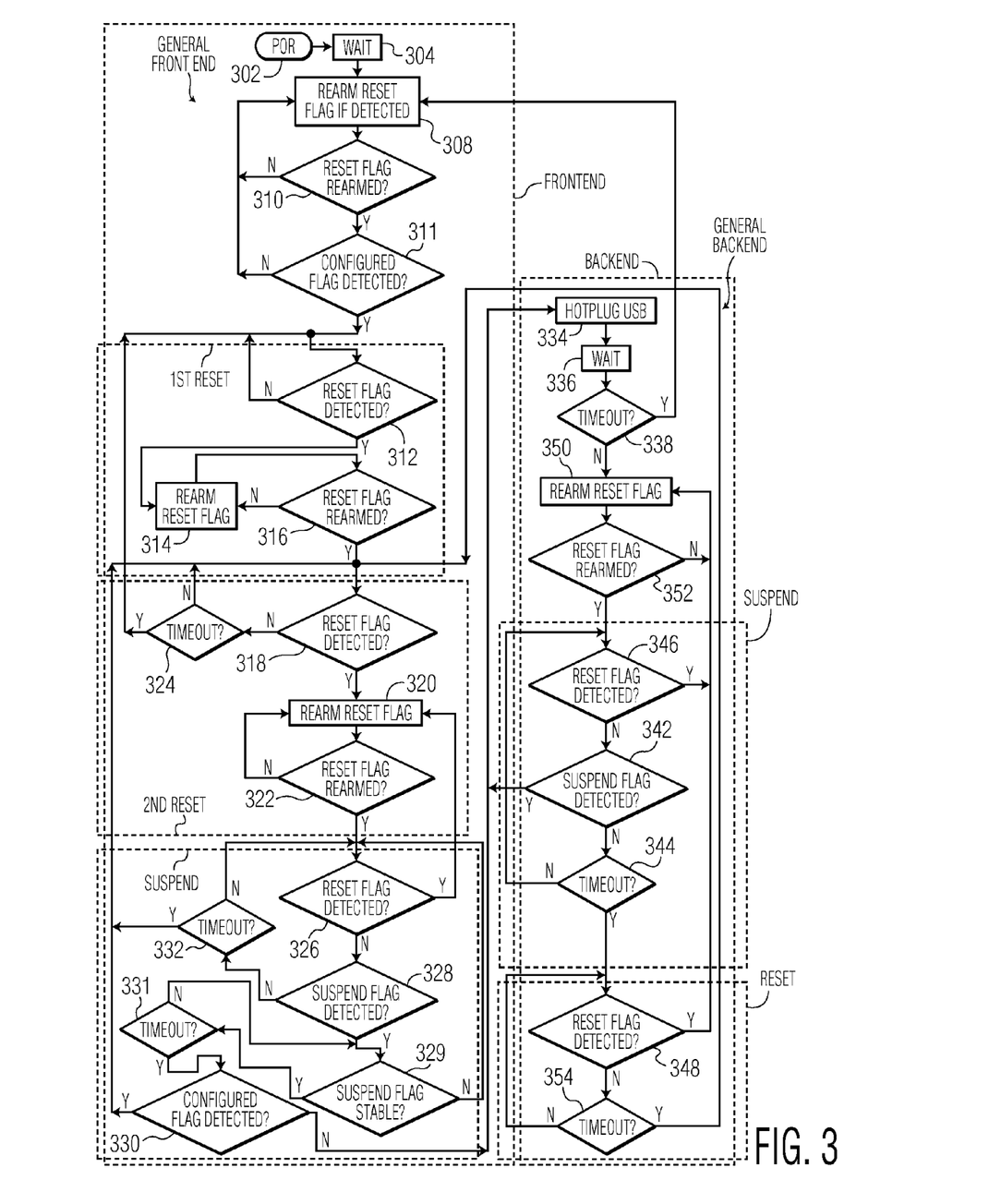
FIG. 3 is a flowchart that illustrates some exemplary operations of the digital EFTB controller of FIG. 1.

FIG. 3 is a flowchart that illustrates an exemplary operation of the digital EFTB controller 130 of FIG. 1. The exemplary operation of the digital EFTB controller includes frontend processing and backend processing. The frontend processing includes a general frontend processing, a first reset frontend processing, a second reset frontend processing and a suspend frontend processing. The backend processing includes a general backend processing, a reset backend processing and a suspend backend processing. The frontend processing checks the "usb configured" signal as well as the "usb suspend"

signal from the USB device controller 112 to detect a first EFTB event. The "usb configured" signal is only reliable to detect the first EFTB event and cannot be depended on for detecting subsequent EFTB events. Consequently, after the first EFTB event, the digital EFTB controller moves from the frontend processing to the backend processing. The backend processing does not rely on the "usb configured" signal from the USB device controller. The backend process only looks at the "usb suspend" to check whether or not one or more EFTB events are still on-going. In the exemplary operation, the host device 104 issues at least 3 reset commands before dying, the USB device 102 is suspended when the host device dies, and the USB device is not in a configured state when the host device dies. Dying in this case means that the host device considers the USB device as non-responsive and disables the USB port or the USB connection to the USB device.

At the general frontend processing, the digital EFTB controller 130 goes through a power up reset (POR) in step 302. After the POR, the digital EFTB controller waits for a period of time, such as about 100 ms, for the analog circuitry of the USB device 102 to settle in step 304. The digital EFTB controller then rearms the reset flag at the analog reset detector 128 to normal (not triggered, undetected) if the reset flag is triggered on power up in step 308, and ensures that the rearm is successful by checking whether or not the analog reset detector triggers the reset flag again to prevent shoot-through in step 310. For example, if the SE0 state is accidently held for a long time period by the host device 104 due to software bugs or hardware glitch, the reset flag at the analog reset detector can potentially trigger, then gets rearmed, and then gets triggered again. If there is no check to make sure the rearm is successful and that the analog reset detector has not been triggered again, a long SE0 signal can potentially go through the frontend processing and potentially trigger the backend processing as well. The digital EFTB controller then waits for the "usb configured" signal to be high to make sure that the USB device is in normal operation and not in any test mode in step 311.

At the first reset frontend processing, the digital EFTB controller 130 checks the reset flag at the analog reset detector 128 in step 312. If the reset flag is detected, the digital EFTB controller rearms the reset flag to normal (not triggered, undetected) in step 314. Then, in step 316, the digital EFTB controller ensures that the rearm is successful by checking whether or not the analog reset detector triggers the reset flag again to prevent the shoot-through.

After the first reset flag is detected, the digital EFTB controller 130 detects whether or not a second reset flag is triggered at the analog reset detector 128. At the second reset frontend processing, the digital EFTB controller 130 checks the reset flag in step 318. If the reset flag is detected, the digital EFTB controller rearms the reset flag to normal (not triggered, undetected) in step 320.

Then, in step 322, the digital EFTB controller ensures that the rearm is successful by checking whether or not the analog reset detector triggers the reset flag again to prevent the shoot-through. In step 324, if the reset flag is not detected within a timeout period, such as 5 seconds, the digital EFTB controller goes back to step 312 at the first reset frontend processing. The two consecutive reset processing is used to avoid false triggering of the suspend frontend due to normal USB resets, USB compliance testing or software driver bug.

The suspend frontend processing happens after two consecutive reset flags are detected within a timeout period, such as 5 seconds. In the suspend frontend processing, the digital EFTB controller 130 checks whether or not the "usb suspend" signal is logical high within a timeout period, such as 5 seconds. The digital EFTB controller also checks the reset flag and rearms any triggered reset flag in step 326. In steps 328 and 330, respectively, the digital EFTB controller checks the "usb suspend" signal and the "usb configured" signal from the USB device controller 112 to determine whether an EFTB event has occurred in the USB device 102. In step 332, if the "usb suspend" signal is not detected as being logical high within the timeout period, the digital EFTB controller goes back to step 318 at the second reset frontend processing. In steps 329 and 331, the digital EFTB controller checks that the "usb suspend" signal is stable and always logical high for a time period, such as 5 seconds, to ensure that the USB device is really suspended and to avoid false triggering due to suspend/resume testing.

At the general backend processing, if the "usb suspend" signal is detected as being high and the "usb configured" signal is not detected as being high, the digital EFTB controller 130 hotplugs the USB device 102 by pulling the signal lines D+/D− low using the IO controller 114 and resetting the USB device for a period of time, such as 300 ms, in step 334. After the hotplug action, the digital EFTB controller waits for the USB device to settle and the USB host to detect and reenumerate the USB device for a period of time, such as 300 ms, in step 336. If the hotplug action in step 334 has repeatedly occurred until a timeout period, such as 60 seconds, expires in step 338, the digital EFTB controller assumes that an unknown event has occurred and goes back to step 308 at the general frontend processing to restart the flowchart operation. Otherwise, the digital EFTB controller will rearm the reset flag triggered by the hotplug action in step 350 and ensures that the rearm is successful in step 352. At this point, the digital EFTB controller knows that an EFTB event has occurred. Because the "usb configured" signal is only reliable to detect the first EFTB event and cannot be depended on for subsequent EFTB events, the digital EFTB controller will check only the "usb suspend" signal for any future EFTB event.

At the suspend backend processing, the digital EFTB controller 130 checks whether or not the "usb suspend" signal is logical high within a timeout period, such as 5 seconds, in step 342. In step 344, if the "usb suspend" signal is not detected as being logical high within the timeout period, the digital EFTB controller goes back to step 348 at the reset backend processing. The reset backend processing detects a single reset instead of the consecutive double reset of the reset frontend processing as the digital EFTB controller knows that an EFTB event has already occurred and any reset flags triggered afterwards will be caused by further EFTB events. The digital EFTB controller also checks the reset flag and rearms any triggered reset flag in step 346. If the "usb suspend" signal is detected as being high, the digital EFTB controller hotplugs the USB device 102 again in step 334.

At the reset backend processing, the digital EFTB controller 130 checks the reset flag at the analog reset detector 128 in step 348. If the reset flag is detected, the digital EFTB controller rearms and ensures that the rearm is successful at steps 350 and 352. Once the reset flag is detected, an EFTB event is assumed to have occurred and the processing goes back to step 342 at the suspend backend processing. If the reset flag is not detected within a timeout period, such as 5 seconds, in step 354, the digital EFTB controller goes back to the second reset frontend processing at step 318 to restart the flowchart for new EFTB events.

Conventionally, an analog circuit that is designated to be triggered on electrical interference is used to detect an EFTB event. This analog circuit may use an extra package pin as an antenna. However, the extra package pin may not be available in low pin-count packages. In addition, the analog circuit is subjected to wafer process variation, external influences such as board layout, supply voltage variation and operating temperature, which can degrade the performance of the analog circuit. The EFTB unit 118 uses a sequence of digital events, such as USB host device reset, USB device controller state and USB device controller configuration status, to determine whether or not an EFTB event has occurred. Compared to the conventional analog circuit, the EFTB unit is more tolerant of conditions noted above.

Turning back to FIG. 1, the reset controller 120 of the USB device 102 is configured to reset the USB device. Under the control of the USB device controller 112, the reset controller may generate a "global reset" signal which goes to all flip-flops, i.e. registers, and state-machines of the USB device, resetting these digital components out of any corrupted state.

The host device 104 of the USB communications system 100 is configured to communicate with the USB device 102 via the USB cable 106. The host device may be any device that includes at least one USB port and at least one USB host controller. In an embodiment, the host device is a computing device such as a computer. For example, the host device may be a desktop computer, a laptop computer, a netbook computer, a pad computer or a tablet computer. The host device transmits data and/or command signals to the USB device and receives navigation information and USB status information from the USB device. USB communications between the USB device and the host device may be disrupted after an EFTB event, causing the host device to reinitiate communications with the USB device. The USB cable contains two signal lines D+ and D−. A voltage source 140 is coupled to the signal line D− through a USB pull-up resistor 142. In an embodiment, the voltage of the voltage source is 3.3 volts (V) and the resistance value of the resistor is 1.5 kilo ohm (kΩ). Although the host device is shown in FIG. 1 as being connected to the USB device via a single USB cable, the host device may be connected to the USB device via multiple USB cables in other embodiments.

Figure 4:
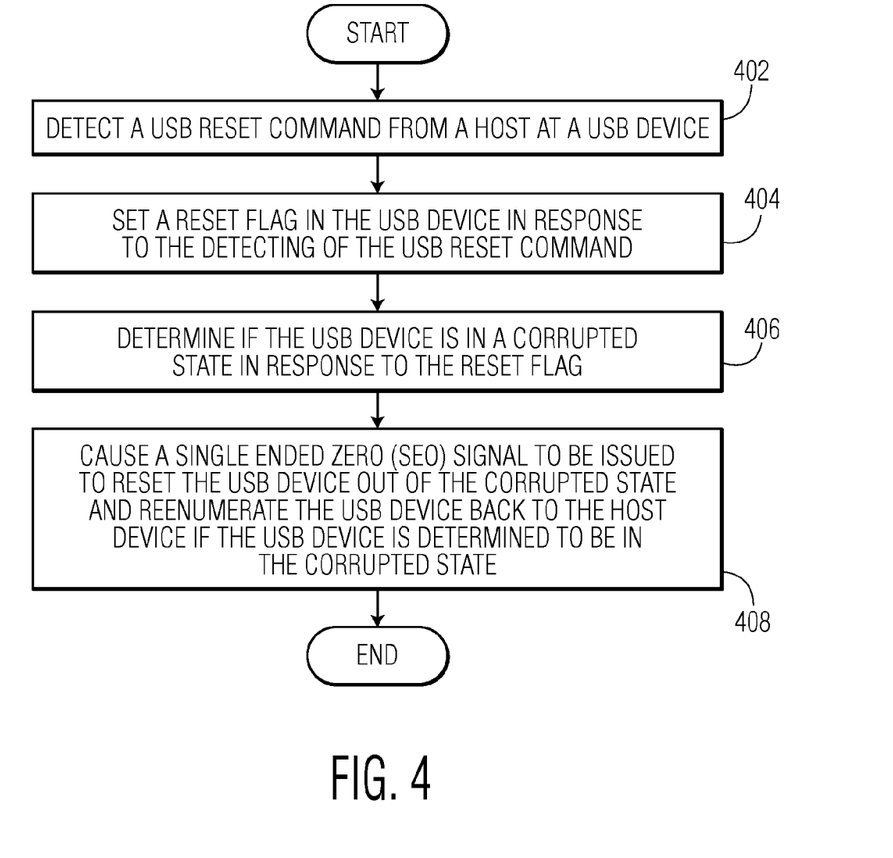
FIG. 4 is a process flow diagram of a method for resetting and reenumerating a USB device in accordance with an embodiment of the invention.

FIG. 4 is a process flow diagram of a method for resetting and reenumerating a USB device in accordance with an embodiment of the invention. At block 402, a USB reset command from a host device is detected at a USB device. At block 404, a reset flag is set in the USB device in response to the detecting of the USB reset command. At block 406, whether or not the USB device is in a corrupted state is determined in response to the reset flag. At block 408, a SE0 signal is caused to be issued to reset the USB device out of the corrupted state and reenumerate the USB device back to the host device if the USB device is determined to be in the corrupted state.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for resetting and reenumerating a Universal Serial Bus (USB) device, the method comprising:
   detecting a USB reset command from a host device at a USB device;
   setting a reset flag in the USB device in response to the detecting;
   determining if the USB device is in a corrupted state in response to the reset flag; and
   causing a Single Ended Zero (SE0) signal to be issued to reset the USB device out of the corrupted state and reenumerate the USB device back to the host device if the USB device is determined to be in the corrupted state.

2. The method of claim 1, wherein detecting the USB reset command and setting the reset flag are performed by an analog circuit.

3. The method of claim 2, wherein determining if the USB device is in the corrupted state and causing the SE0 signal to be issued to reset the USB device out of the corrupted state and reenumerate the USB device back to the host device if the USB device is determined to be in the corrupted state are performed by a digital circuit.

4. The method of claim 3, wherein detecting the USB reset command comprises receiving from the host device an SE0 signal whose signal duration is more than a threshold time duration.

5. The method of claim 3, wherein determining if the USB device is in the corrupted state comprises inspecting two logical signals generated by the USB device in response to signals from the host device.

6. The method of claim 3, wherein causing the SE0 signal to be issued to reset the USB device out of the corrupted state and reenumerate the USB device back to the host device if the USB device is determined to be in the corrupted state comprises resetting digital blocks of the USB device out of any corrupted state in response to the SE0 signal.

7. An Electrical Fast Transient/Burst (EFTB) unit of a Universal Serial Bus (USB) device for resetting the USB device, the EFTB unit comprising:
   an analog reset detector configured to detect a USB reset command from a host device and to set a reset flag in response to the detection of the USB reset command; and
   a digital EFTB controller configured to determine if the USB device is in a corrupted state in response to the reset flag and to cause a Single Ended Zero (SE0) signal to be issued to reset the USB device out of the corrupted state and reenumerate the USB device back to the host device if the USB device is determined to be in the corrupted state.

8. The EFTB unit of claim 7, wherein the digital EFTB controller is further configured to inspect two logical signals that are generated by the USB device in response to signals from the host device to determine if the USB device is in the corrupted state.

9. The EFTB unit of claim 7, wherein the analog reset detector is further configured to detect the USB reset command if the analog reset detector receives from the host device an SE0 signal whose signal duration is more than a threshold time duration.

10. The EFTB unit of claim 7, wherein the analog reset detector is further configured to use a capacitor discharge mechanism to detect the USB reset command from the host device.

11. The EFTB unit of claim 10, wherein the analog reset detector comprises:
- a NOR logic circuit configured to receive signals from the host device via Input/Output (IO) pads contained in a padframe of the USB device;
- an inverter connected to the NOR logic circuit;
- a first switch connected to the inverter and a first voltage source;
- a second switch connected to the first switch and a current source;
- a capacitor connected to the first switch and the second switch;
- a comparator connected to the capacitor and a second voltage source, wherein the comparator is configured to generate the reset flag; and
- a latch connected to the comparator and configured to store the reset flag.

12. The EFTB unit of claim 11, wherein a voltage level of the first voltage source is higher than the voltage level of the second voltage source.

13. The EFTB unit of claim 7 further comprising two buffers configured to connect the analog reset detector to the host device to receive signals from the host device via Input/Output (IO) pads contained in a padframe of the USB device.

14. A Universal Serial Bus (USB) device comprising:
- a padframe containing Input/Output (IO) pads;
- a USB device controller configured to transmit signals to a host device via the IO pads and to generate USB status signals based on signals that are received from the host device via the IO pads;
- an Electrical Fast Transient/Burst (EFTB) unit comprising:
  - an analog reset detector configured to detect a USB reset command from the host device and to set a reset flag in response to the detection of the USB reset command; and
  - a digital EFTB controller configured to determine if the USB device is in a corrupted state in response to the reset flag and the USB status signals and to cause a Single Ended Zero (SE0) signal to be issued to reset the USB device out of the corrupted state and reenumerate the USB device back to the host device if the USB device is determined to be in the corrupted state;
- an IO controller coupled to the USB device controller, the IO pads and the EFTB unit; and
- a reset controller configured to reset the USB device globally and out of the corrupted state in response to the SE0 signal.

15. The USB device of claim 14 further comprising:
- an image sensor array configured to obtain image information; and
- a processor coupled to the image sensor array and the USB device controller and configured to process the image information to generate navigation signals.

16. The USB device of claim 14, wherein the digital EFTB controller is further configured to inspect two logical signals that are generated by the USB device in response to signals from the host device to determine if the USB device is in the corrupted state.

17. The USB device of claim 14, wherein the analog reset detector is further configured to detect the USB reset command if the analog reset detector receives from the host device an SE0 signal whose signal duration is more than a threshold time duration.

18. The USB device of claim 14, wherein the analog reset detector is further configured to use a capacitor discharge mechanism to detect the USB reset command from the host device.

19. The USB device of claim 18, wherein the analog reset detector comprises:
- a NOR logic circuit configured to receive signals from the host device via the IO pads contained in the padframe;
- an inverter connected to the NOR logic circuit;
- a first switch connected to the inverter and a first voltage source;
- a second switch connected to the first switch and a current source;
- a capacitor connected to the first switch and the second switch;
- a comparator connected to the capacitor and a second voltage source, wherein the comparator is configured to generate the reset flag, and wherein a voltage level of the first voltage source is higher than the voltage level of the second voltage source; and
- a latch connected to the comparator and configured to store the reset flag.

20. The USB device of claim 14, wherein the EFTB unit further comprises two buffers configured to connect the analog reset detector to the host device to receive signals from the host device via the IO pads contained in the padframe.

* * * * *